(12) United States Patent
Pritz et al.

(10) Patent No.: US 12,334,675 B2
(45) Date of Patent: Jun. 17, 2025

(54) CONNECTOR

(71) Applicant: MD ELEKTRONIK GmbH, Waldkraiburg (DE)

(72) Inventors: Helmut Pritz, Ampfing (DE); Thomas Halbig, Dietfurt (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 416 days.

(21) Appl. No.: 17/960,173

(22) Filed: Oct. 5, 2022

(65) Prior Publication Data

US 2023/0123491 A1 Apr. 20, 2023

(30) Foreign Application Priority Data

Oct. 19, 2021 (DE) .................. 10 2021 127 030.8

(51) Int. Cl.
*H01R 13/436* (2006.01)
*H01R 13/516* (2006.01)
*H01R 13/627* (2006.01)
*H01R 13/639* (2006.01)

(52) U.S. Cl.
CPC ..... *H01R 13/6273* (2013.01); *H01R 13/4362* (2013.01); *H01R 13/516* (2013.01); *H01R 13/639* (2013.01)

(58) Field of Classification Search
CPC ............ H01R 13/6273; H01R 13/4362; H01R 13/516; H01R 13/639
See application file for complete search history.

(56) References Cited

U.S. PATENT DOCUMENTS

| 5,464,356 A | * | 11/1995 | Nebeshima | ........ H01R 13/4362 |
| | | | | 439/752 |
| 5,474,477 A | * | 12/1995 | Aoyama | ............ H01R 13/4362 |
| | | | | 439/752 |
| 5,609,503 A | * | 3/1997 | Tsuji | .................. H01R 13/4362 |
| | | | | 439/752 |

(Continued)

FOREIGN PATENT DOCUMENTS

| DE | 112015000415 B4 | 6/2020 |
| DE | 102020117717 B4 | 2/2022 |

(Continued)

*Primary Examiner* — Thanh Tam T Le
(74) *Attorney, Agent, or Firm* — LEYDIG, VOIT & MAYER, LTD.

(57) ABSTRACT

A connector for connection to a mating connector includes a connector housing having a contact chamber configured to accommodate a contact assembly extending from a contact side toward a mating side, and a secondary retention element having two mounting arms and a securing element disposed therebetween. The connector housing has an access opening. The secondary retention element is movable between a pre-latched and a final latched position. One of the mounting arms has a first latching unit which, in the final latched position, is connected to a first mating latching unit disposed on the connector housing. One of the mounting arms has a locking element extending away parallel to a mating axis, which in the pre-latched position, blocks connection to the mating connector. In the final latched position, the securing element extends through the access opening into the contact chamber and locks the contact assembly in place.

20 Claims, 3 Drawing Sheets

(56) References Cited

U.S. PATENT DOCUMENTS

| | | | | |
|---|---|---|---|---|
| 5,634,826 | A * | 6/1997 | Jean | H01R 13/4362 439/752 |
| 5,848,919 | A * | 12/1998 | Nagano | H01R 13/4362 439/752 |
| 5,934,946 | A | 8/1999 | Nakamura | |
| 6,010,374 | A * | 1/2000 | Miwa | H01R 13/4362 439/752 |
| 6,171,150 | B1 * | 1/2001 | Saito | H01R 13/4361 439/352 |
| 6,390,859 | B2 * | 5/2002 | Furutani | H01R 13/4362 439/752 |
| 6,648,699 | B1 * | 11/2003 | Makino | H01R 13/4362 439/752 |
| 6,902,443 | B2 * | 6/2005 | Hara | H01R 13/4362 439/752 |
| 7,261,603 | B2 * | 8/2007 | Takahashi | H01R 13/4361 439/752 |
| 7,347,742 | B2 * | 3/2008 | Hall | H01R 13/741 439/752 |
| 7,347,745 | B1 * | 3/2008 | Raudenbush | H01R 13/4223 439/752 |
| 7,445,524 | B2 * | 11/2008 | Horiuchi | H01R 13/4361 439/752 |
| 7,500,887 | B2 * | 3/2009 | Ichio | H01R 13/4362 439/752 |
| 7,762,854 | B1 * | 7/2010 | Peng | H01R 24/50 439/752 |
| 7,980,894 | B1 * | 7/2011 | Hall | H01R 24/40 439/585 |
| 10,461,457 | B1 * | 10/2019 | Aono | H01R 13/4223 |
| 10,461,458 | B2 * | 10/2019 | Kim | H01R 13/639 |
| 10,594,069 | B2 * | 3/2020 | Kon | H01R 13/436 |
| 10,734,762 | B2 * | 8/2020 | Kanemura | H01R 13/6582 |
| 10,978,829 | B2 * | 4/2021 | Wimmer | H01R 13/506 |
| 11,183,793 | B2 * | 11/2021 | Liptak | H01R 13/422 |
| 11,482,809 | B2 * | 10/2022 | Zebhauser | H01R 13/516 |
| 11,545,777 | B2 * | 1/2023 | Sundarakrishnamachari | H01R 13/4223 |
| 2020/0112125 | A1 | 4/2020 | Liptak et al. | |

FOREIGN PATENT DOCUMENTS

| | | |
|---|---|---|
| EP | 3800744 A1 | 4/2021 |
| JP | 2008243692 A | 10/2008 |
| JP | 2016090760 A | 5/2016 |

* cited by examiner

CONNECTOR

CROSS REFERENCE TO RELATED APPLICATIONS

This application claims benefit to German Patent Application No. DE 10 2021 127 030.8, filed on Oct. 19, 2021, which is hereby incorporated by reference herein.

FIELD

The invention relates to a connector for connection to a mating connector. The connector is particularly suitable for connecting optical and electrical conductors.

BACKGROUND

Conductors that transmit, for example, optical and/or electrical signals are typically connected together or to a device using connectors which can be releasably connected to a complementary mating connector, thereby creating a signal-transmitting connection. For this purpose, the conductor to be connected is connected in a signal-conducting manner to the connector. The mating connector, on the other hand, is connected in a signal-conducting manner to the partner to be connected, so that when the connector and the mating connector are connected, a signal-transmitting connection is created between the conductor and the respective partner to be connected.

In particular, in the case of connectors where it must be ensured that the connection between the conductor and the connector and/or the connection between the connector and the mating connector are/is properly made, additional retention systems are frequently used. For example, a secondary locking means may be provided which is capable of additionally securing the conductor on or in the connector. The connector may further have an insertion-preventing means which prevents the connector and the mating connector from being connected when the conductor is not properly connected to the connector and/or the partner to be connected is not properly connected to the mating connector. Furthermore, depending on the available space, it may be necessary to connect a plurality of conductors via one connector to the corresponding complementary mating connector.

SUMMARY

In an embodiment, the present invention provides a connector for connection to a mating connector. The connector includes a connector housing having at least one contact chamber configured to accommodate a contact assembly extending from a contact side toward a mating side, and a secondary retention means having two mounting arms and at least one securing element disposed between the mounting arms. The connector housing has at least one access opening connected to the at least one contact chamber. The secondary retention means is movable between a pre-latched position and a final latched position. At least one of the two mounting arms has a first latching unit which, in the final latched position, is connected to a first mating latching unit disposed on the connector housing. At least one of the two mounting arms has a locking element extending away parallel to a mating axis. In the pre-latched position, the locking element blocks connection to the mating connector. In the final latched position, the securing element extends through the access opening into the contact chamber and locks the contact assembly in place in the contact chamber.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
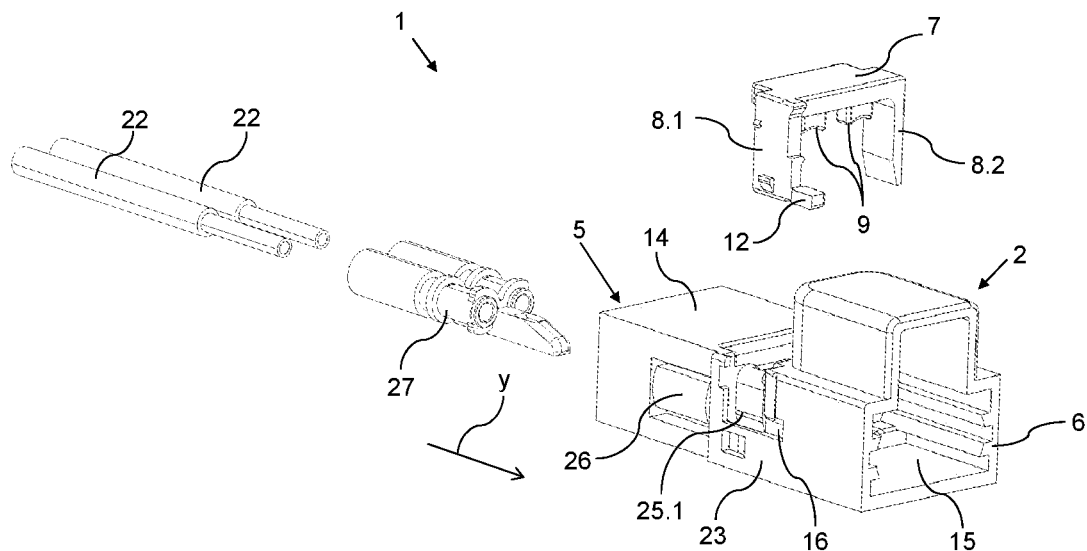
FIG. 1 is an exploded view of a first embodiment of a connector according to the invention.

In existing approaches, the additional retention systems and the design to be able to connect a plurality of conductors using one connector significantly increase the complexity of the connector. Especially in the case of small connectors such as are used, for example, for optical conductors and/or radio-frequency conductors, the wide range of functions results in a high degree of complexity and thus in increased manufacturing complexity and cost of the connector.

In an embodiment, the present invention provides a connector that has additional features, such as a secondary locking means and/or an insertion-preventing means, yet is still simple and compact in design.

According to an embodiment of the present invention, an inventive connector for connection to a mating connector has a connector housing. The connector housing has at least one contact chamber for accommodating a contact assembly. The contact assembly preferably includes at least one signal conductor. If the connector is connected to a mating connector, it is preferred that the contact assembly of the connector be connectable to a contact assembly of the mating connector at least in such a way that a signal can be transmitted from a signal conductor of the connector to a signal conductor of the mating connector. The signal conductor may be an electrical or an optical conductor. The contact chamber extends from a contact side toward a mating side. In this context, the contact side can be understood to be a side of the connector housing where the contact assembly can be inserted into the contact chamber. The mating side can be understood to be a side of the connector housing where the connector housing can be connected to a mating connector. The contact chamber is preferably accessible from both the contact side and the mating side. The connector according to an embodiment of the invention further has a secondary retention means. The secondary retention means has two mounting arms and at least one securing element. The securing element is disposed between the mounting arms. The secondary retention means is movable between a pre-latched position and a final latched position. This movement is preferably perpendicular to a mating axis of the connector. At least one of the two mounting arms has a first latching unit which, in the final latched position, is connected to a first mating latching unit disposed on the connector housing. The first latching unit may be configured, for example, as a latch or snap hook, the first mating latching unit being configured complementarily to the first latching unit, thereby enabling a mechanical and, in particular, releasable connection between the first latching unit and the first mating latching unit. At least one of the two mounting arms has a locking element extending parallel to the mating axis away from the mounting arm on which the locking element is disposed. The mating axis can be understood to be a movement axis along which the connector or the mating connector is moved to establish a connection between the connector and the mating connector. In the pre-latched position, the locking element blocks connection to the mating connector. The connector housing has at least one access opening extending into the contact chamber. Preferably, the access opening is located on a side of the connector that is different from the mating side and the contact side. In the final latched position, the securing element extends through the access opening into the contact chamber, thereby locking the contact assembly in place in the contact chamber.

The connector according to an embodiment of the invention is characterized above all in that, in addition to a primary locking of the contact assembly in the contact chamber, a secondary locking is made possible by the secondary retention means, there being a high degree of freedom for the design of the contact chamber, which is associated with a high degree of freedom for the design of the contact assembly. Furthermore, it is still ensured that a connection between the connector and the mating connector is only possible when the secondary retention means is in the final latched position, thereby ensuring that the contact assembly is locked in place.

The access opening may be located on a first housing side adjacent the mating side and/or the contact side. The contact side and the mating side may be disposed opposite each other. However, it is also possible that the contact side and the mating side may be disposed at an angle, especially a right angle, with respect to each other if the connector is configured as an angled connector.

To ensure that the contact assembly can be easily inserted into or removed from the contact chamber when the secondary retention means is in the pre-latched position, the securing element may be located outside the contact chamber when in the pre-latched position. Furthermore, the securing element may also be located outside the access opening.

The connector housing may have an insertion chamber into which a mating connector housing of the mating connector can be at least partially inserted. In addition, the insertion chamber may have keying elements to ensure that only a mating connector housing having complementary keying elements can be connected to the connector housing. The locking element may be disposed in the insertion chamber. The mating connector housing can preferably be inserted in the insertion chamber both in the pre-latched position and in the final latched.

The locking element may be insertable into the insertion chamber through a lateral aperture in the connector housing. The lateral aperture is preferably disposed in the region of the insertion chamber. Furthermore, the lateral aperture is preferably located on a housing side of the connector housing which side is adjacent the mating side. The lateral aperture may have a contour that at least partially corresponds to an outer contour of the locking element.

The locking element may preferably be insertable into the insertion chamber through the lateral aperture in the pre-latched position. It is therefore particularly preferred that, in the pre-latched position, the locking element and the lateral aperture be in alignment with each other.

Preferably, the locking element is insertable into the insertion chamber by means of a pivoting movement. Therefore, at least the mounting arm having the locking element is preferably pivotable about a pivot axis that is oriented perpendicular to the mating axis. Particularly preferably, the pivot axis is oriented parallel to the mating side.

The connector housing may have a shoulder in the insertion chamber. In the final latched position, the locking element is preferably in alignment with the shoulder. The shoulder may be both parallel and perpendicular to the mating axis. The mating connector housing may have a surface portion that has a shape complementary to the shoulder and to the locking element, which is arranged in alignment with the shoulder. A recess into which the locking element can be inserted in the final latched position may be disposed within the shoulder or between the shoulder and an inner housing wall.

At least one of the two mounting arms may have a second latching unit which, in the pre-latched position, is connected to a second mating latching unit disposed on the connector housing. Preferably, a connection between the second latching unit and the second mating latching unit is released in the final latched position. The second mating latching unit is preferably configured complementarily to the second latching unit, so that a mechanical and releasable connection can be achieved between the latching unit and the mating latching unit, in particular by interlocking fit and/or friction fit.

Furthermore, one of the two mounting arms may have the second latching unit and the respective other mounting arm may have a third latching unit. In the pre-latched position, the second latching unit may be connected to the second mating latching unit disposed on the connector housing. In the pre-latched position, the third latching unit may be connected to a third mating latching unit disposed on the connector housing. It is also preferred that the third latching unit be released from the third mating latching unit in the final latched position. It is further preferred that the second latching unit be different from the third latching unit.

The contact assembly may have two signal conductors, so that two signal conductors of the connector can be connected to two signal conductors of the mating connector. The connector housing may have two access openings, and the secondary retention means may have two securing elements, each of which is disposed in one of the access openings, at least in the final latched position. In the region of the contact assembly, the signal conductors are arranged parallel to each other. It is also preferred that the contact assembly have a contact carrier holding both signal conductors.

The connector housing may have a guide portion on each of a second and third housing side. Each guide portion may have one of the mounting arms disposed therein. It is preferred that the mounting arms move along the guide portions when moving between the pre-latched position and the final latched position. The first, second and/or third mating latching units may be disposed within the guide portions. The guide portions may be configured as grooves or channels.

The second and third housing sides may be disposed opposite each other and adjacent the first housing side. The guide portions may extend from the first housing side to a housing side that is opposite the first housing side.

FIG. 1 shows a three-dimensional exploded view of a first embodiment of a connector 1 according to the invention. Connector 1 has a connector housing 2. A contact assembly can be disposed in connector housing 2. In the present embodiment, the contact assembly is composed of a contact carrier 27 and two signal conductors 22. The two signal conductors 22 are both held by contact carrier 27. Signal conductors 22 are optical waveguides for transmitting light signals. Connector housing 2 has two primary locking means 26 in the form of snap hooks which releasably secure the contact assembly within connector housing 2. The contact assembly can be inserted into connector housing 2 parallel to a mating axis y at a contact side 5. Opposite the contact side 5, there is located a mating side 6, where connector 1 can be connected to a mating connector. Connector housing 2 has an insertion chamber 15 into which a mating connector housing can be inserted. The connector 1 according to an embodiment of the invention further has a secondary retention means 7. Secondary retention means 7 has two mounting arms 8.1; 8.2. Two securing elements 9 are disposed between mounting arms 8.1; 8.2. Furthermore, a locking element 12 is disposed on one mounting arm 8.1. Secondary retention means 7 is movable on connector housing 2 between a pre-latched position and a final latched position. For this purpose, mounting arms 8.1; 8.2 are disposed in guide portions 25.1; 25.2 and are guided within guide portions 25.1; 25.2 during movement between the final latched position and the pre-latched position.

Figure 2:
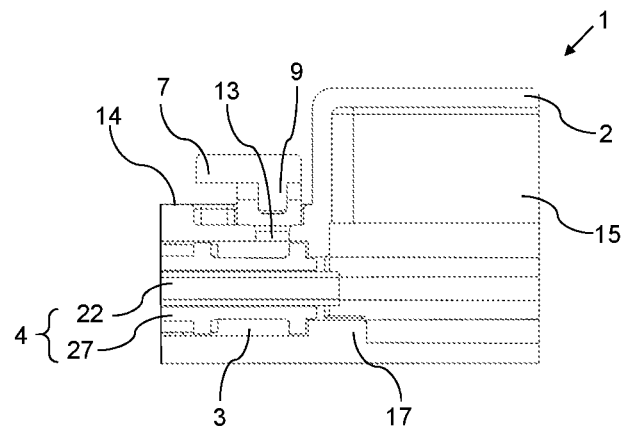
FIG. 2 is a sectional view of the inventive connector according to the first embodiment.

FIG. 2 shows a sectional view of the first embodiment of the connector 1 according to the invention. The sectional plane extends parallel to mating axis y. Contact assembly 4 is disposed within a contact chamber 3 in connector housing 2. Secondary retention means 7 is in the pre-latched position. Securing element 9 is disposed in alignment with an access opening 13 located on a first housing side 14 of connector housing 2. Access opening 13 allows access into contact chamber 3 via the first housing side 14.

Figure 3:
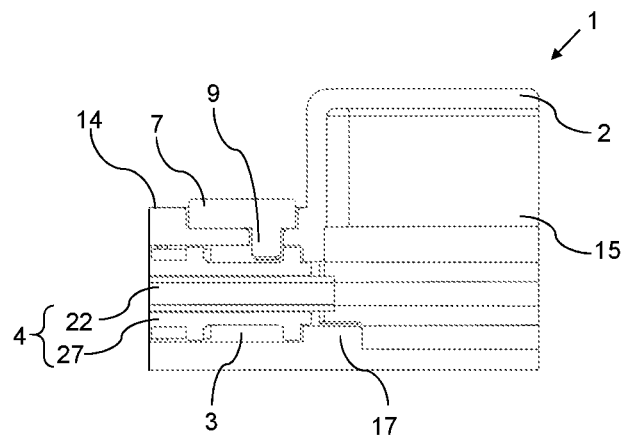
FIG. 3 is another sectional view of the inventive connector according to the first embodiment.

FIG. 3 shows the first embodiment of the inventive connector 1 in a sectional view as in FIG. 2, but with secondary retention means 7 located in the final latched position. Securing element 9 extends through access opening 13 into contact chamber 3. Contact carrier 27 has two portions having an outer diameter that is larger than an intermediate portion located between these two portions. Since securing element 9 is disposed in the region of the intermediate portion, contact assembly 4 can no longer be removed from the contact chamber, so that securing element 9 secures contact assembly 4 in contact chamber 3.

Figure 4:
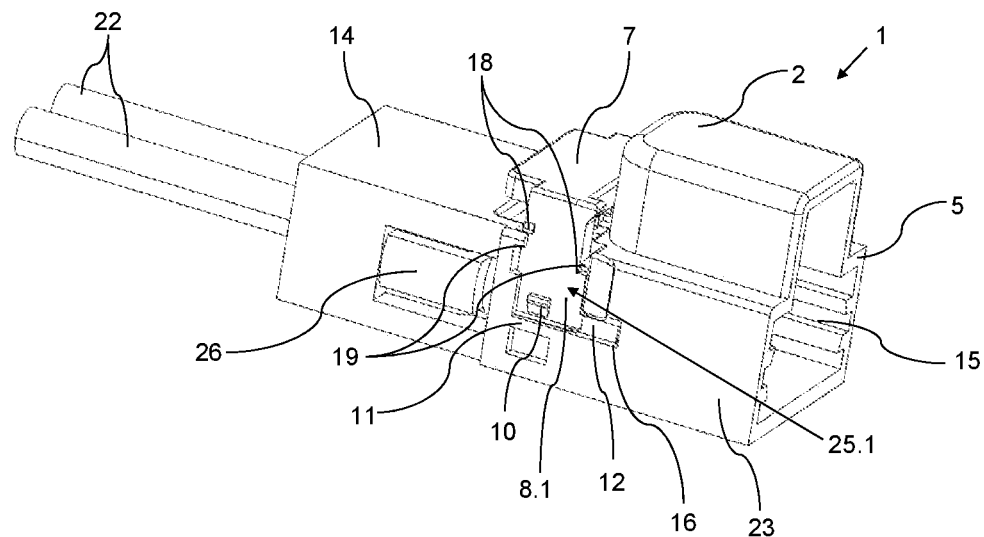
FIG. 4 is a three-dimensional view showing the inventive connector according to the first embodiment in a pre-latched position.

FIG. 4 shows the first embodiment of the inventive connector 1 in a three-dimensional view, in which a second housing side 23 faces the viewer. Secondary retention means 7 is in the pre-latched position. The mounting arm 8.1 facing the viewer is disposed in a guide portion 25.1 formed on second housing side 23 of connector housing 2. Mounting arm 8.1 has a first latching unit 10, which is composed of a snap hook disposed on a side of mounting arm 8.1 facing away from connector housing 2. Mounting arm 8.1 further includes a second latching unit 18, which is composed of a latching nose and a stop. The latching nose and the stop are disposed opposite each other on narrow sides of mounting arm 8.1. In the pre-latched position, second latching unit 18 is releasably connected to a second mating latching unit 19 disposed on connector housing 2. Secondary retention means 7 is held in the pre-latched position by means of the connection between second latching unit 18 and second mating latching unit 19. Locking element 12 is inserted in insertion chamber 15 through a lateral aperture 16. In a process step, locking element 12 was inserted in insertion chamber 15 through lateral aperture 16 by pivoting mounting arm 8.1 perpendicular to mating axis y and parallel to mating side 6. Locking element 12 blocks connector 1 from being connected to a mating connector as long as secondary retention means 7 is in the pre-latched position.

Figure 5:
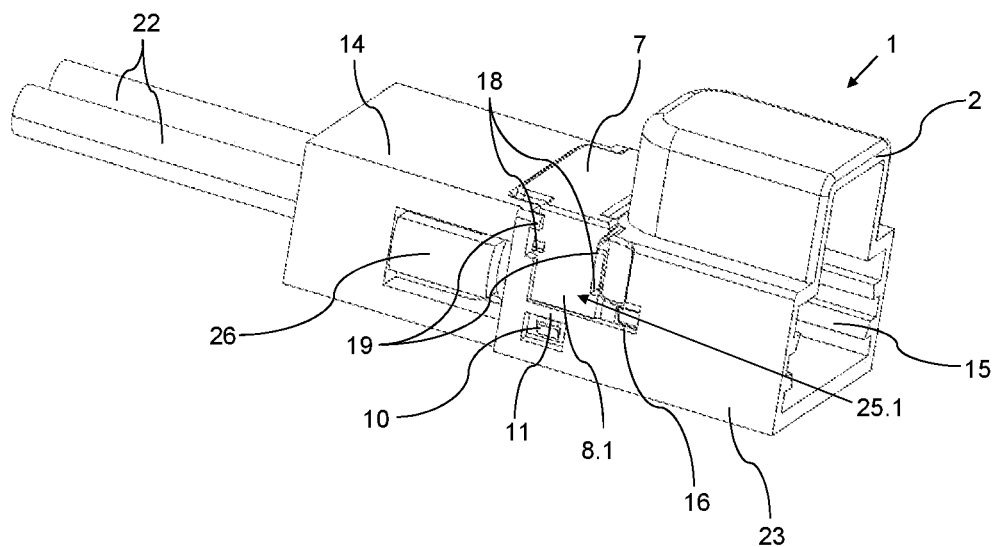
FIG. 5 is a three-dimensional view showing the inventive connector according to the first embodiment in a final latched position.

FIG. 5 shows the first embodiment of the inventive connector 1 in another three-dimensional view, in which second housing side 23 faces the viewer. Secondary retention means 7 is in the final latched position. First latching unit 10 is releasably connected to a first mating latching unit 11 on connector housing 2, so that secondary retention means 7 is held in the final latched position. The connection between second latching unit 18 and second mating latching unit 19 is released in the final latched position.

Figure 6:
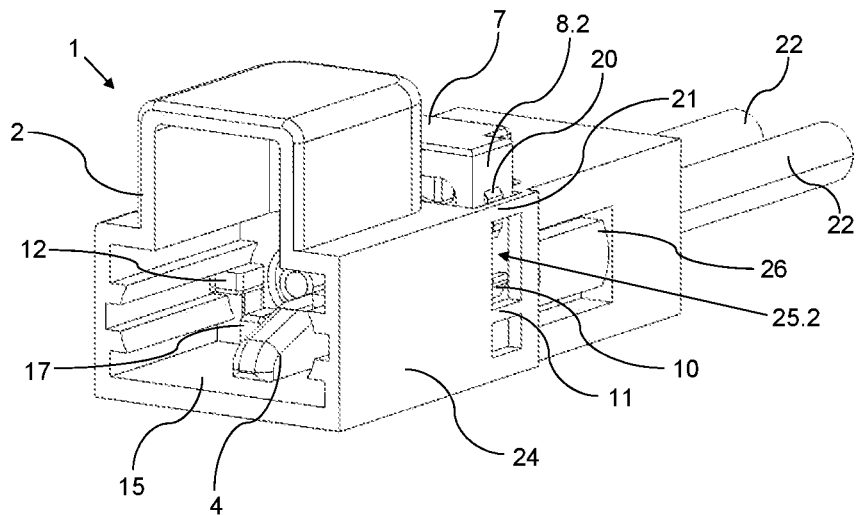
FIG. 6 is another three-dimensional view showing the inventive connector according to the first embodiment in a pre-latched position.

FIG. 6 shows the first embodiment of the inventive connector 1 in a further three-dimensional view, in which a third housing side 24 faces the viewer. Secondary retention means 7 is in the pre-latched position. Mounting arm 8.2 has a third latching unit 20 which, in the pre-latched position, is connected to a third mating latching unit 21 on connector housing 2. Third latching unit 20 differs in design from second latching unit 18 by two latch hooks between which third mating latching unit 21 is disposed in the form of a cross-member.

Figure 7:
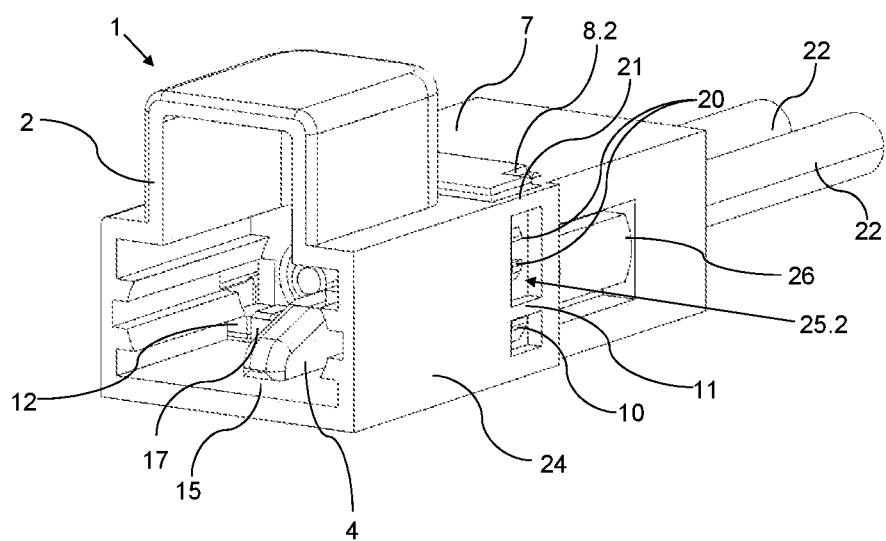
FIG. 7 is a further three-dimensional view showing the inventive connector according to the first embodiment in a final latched position.

FIG. 7 shows the first embodiment of the inventive connector 1 in yet another three-dimensional view in which third housing side 24 faces the viewer, but with secondary retention means 7 located in the final latched position. The connection between third latching unit 20 and third mating latching unit 21 is released in the final latched position. However, mounting arm 8.2 also has a first latching unit 10, which is releasably connected to a mating latching unit 11 disposed on third housing side 24 of connector housing 2. Locking element 12 is disposed in alignment with a shoulder 17 disposed in insertion chamber 15. Hence, locking element 12 clears insertion chamber 15, so that the inventive connector 1 can be connected to a mating connector.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 connector
2 connector housing
3 contact chamber
4 contact assembly
5 contact side
6 mating side
7 secondary retention means
8 mounting arms
9 securing element
10 first latching unit
11 first mating latching unit
12 locking element
13 access opening
14 first housing side
15 insertion chamber
16 lateral aperture
17 shoulder
18 second latching unit
19 second mating latching element
20 third latching unit
21 third mating latching element
22 signal conductor
23 second housing side
24 third housing side
25 guide portion
26 primary locking means
27 contact carrier

What is claimed is:

1. A connector for connection to a mating connector, the connector comprising:
a connector housing having at least one contact chamber configured to accommodate a contact assembly extending from a contact side toward a mating side, the connector housing having at least one access opening connected to the at least one contact chamber; and
a secondary retention element having two mounting arms and at least one securing element disposed between the mounting arms, the secondary retention element being movable between a pre-latched position and a final latched position,
wherein:
at least one of the two mounting arms has a first latching unit which, in the final latched position, is connected to a first mating latching unit disposed on the connector housing,
at least one of the two mounting arms has a locking element protruding toward the contact assembly and extending parallel to a mating axis,
in the pre-latched position, the locking element protrudes inward within the connector housing toward the contact assembly and is positioned between the contact assembly and the mating connector so as to block the mating connector from connecting to the contact assembly, in the final latched position, the securing element extends through the access opening into the contact chamber and locks the contact assembly in place in the contact chamber.

2. The connector as recited in claim 1, wherein the access opening is located on a first housing side adjacent the mating side and/or the contact side.

3. The connector as recited in claim 1, wherein, in the pre-latched position, the securing element is located outside the contact chamber.

4. The connector as recited in claim 1, wherein the connector housing has an insertion chamber into which a mating connector housing of the mating connector is at least partially insertable.

5. The connector as recited in claim 4, wherein, in the pre-latched position and the final latched position, the locking element is disposed in the insertion chamber.

6. The connector as recited in claim 5, wherein the locking element is insertable into the insertion chamber through a lateral aperture in the connector housing.

7. The connector as recited in claim 6, wherein the locking element is inserted into the insertion chamber through the lateral aperture in the pre-latched position.

8. The connector as recited in claim 6, wherein the locking element is insertable into the insertion chamber by a pivoting movement.

9. The connector as recited in claim 4, wherein the connector housing has a shoulder in the insertion chamber, and wherein the locking element is in alignment with the shoulder in the final latched position.

10. The connector as recited in claim 1, wherein at least one of the two mounting arms has a second latching unit which, in the pre-latched position, is connected to a second mating latching unit disposed on the connector housing.

11. The connector as recited in claim 10, wherein one of the mounting arms has the second latching unit and the respective other mounting arm has a third latching unit, and wherein, in the pre-latched position, the second latching unit is connected to a second mating latching unit disposed on the connector housing, and the third latching unit is connected to a third mating latching unit disposed on the connector housing.

12. The connector as recited in claim 1, wherein the contact assembly has at least two signal conductors.

13. The connector as recited in claim 12, wherein the at least two signal conductors are arranged in parallel to each other.

14. The connector as recited in claim 1, wherein the connector housing has a guide portion on each of a second and third housing side, each of the guide portions having, in the final latched position, one of the mounting arms disposed therein.

15. The connector as recited in claim 14, wherein the second and third housing sides are disposed opposite each other and adjacent a first housing side adjacent the mating side and/or the contact side.

16. The connector as recited in claim 1, wherein the locking element protrudes from the at least one mounting arm towards the contact assembly.

17. The connector as recited in claim 1, wherein the connector housing includes two guide rails protruding inward into the contact chamber and extending axially along the connector housing parallel to the mating axis.

18. The connector as recited in claim 17, wherein the locking element protrudes into the contact chamber of the connector housing so as to occupy part of an insertion space between the two guide rails and thereby block the mating connector from connecting to the contact assembly in the pre-latched position.

19. The connector as recited in claim 18, wherein a first of the two guide rails has a first length and a second of the two guide rails has a second length, the second length being shorter than the first length by at least an axial extent of the locking element,
- wherein the locking element is configured to be positioned in axial alignment with a shoulder of the connector housing in the insertion chamber in the final latched position, and
- wherein the locking element is configured to move from the insertion space past the second of the two guide rails to the final latched position.

20. The connector as recited in claim 19, wherein the connector housing includes a recess in the shoulder or between the shoulder and an inner connector housing wall facing an insertion chamber into which a mating connector housing of the mating connector is at least partially insertable, and wherein the locking element is disposed in the recess in the final latched position.

\* \* \* \* \*